US009699711B2

(12) United States Patent
Wu et al.

(10) Patent No.: US 9,699,711 B2
(45) Date of Patent: *Jul. 4, 2017

(54) SYSTEM, METHOD AND DEVICE FOR SWITCHING BETWEEN WWAN AND WLAN IN A MOBILE WIRELESS HOTSPOT

(71) Applicant: Novatel Wireless, Inc., San Diego, CA (US)

(72) Inventors: John Wu, San Diego, CA (US); Brad Kim, San Diego, CA (US); Slim Souissi, San Diego, CA (US)

(73) Assignee: Novatel Wireless, Inc., San Diego, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 13/899,425

(22) Filed: May 21, 2013

(65) Prior Publication Data

US 2014/0153556 A1    Jun. 5, 2014

Related U.S. Application Data

(63) Continuation of application No. 12/645,398, filed on Dec. 22, 2009, now Pat. No. 8,446,830.

(51) Int. Cl.
*H04W 4/00*        (2009.01)
*H04W 36/00*       (2009.01)
(Continued)

(52) U.S. Cl.
CPC ............. *H04W 48/16* (2013.01); *H04L 12/66* (2013.01); *H04W 48/18* (2013.01); *H04W 76/04* (2013.01);
(Continued)

(58) Field of Classification Search
CPC ..... H04L 12/2854; H04L 12/46; H04L 12/66; H04L 29/0621; H04L 29/06224;
(Continued)

(56) References Cited

U.S. PATENT DOCUMENTS 7,136,651 B2    11/2006    Kalavade
7,239,632 B2    7/2007    Kalavade et al.
(Continued)

FOREIGN PATENT DOCUMENTS

WO    WO 2006/043956 A1    4/2006

OTHER PUBLICATIONS

Communication pursuant to Article 94(3) EPC for EP Application No. 10 162 986.3, dated Nov. 29, 2011.
(Continued)

*Primary Examiner* — Alpus H Hsu
(74) *Attorney, Agent, or Firm* — TechLaw LLP

(57) ABSTRACT

An apparatus comprises a first interface module configured to interface with one or more user devices through a wireless local area network (WLAN) connection; a second interface module configured to interface with a wireless communication network through a wireless wide area network (WWAN) connection; and a controller. The controller is configured to detect availability of carrier hotspots; if no carrier hotspot is detected, route traffic to and from the one or more user devices through the WWAN connection; and if a carrier hotspot is detected, route traffic to and from the one or more user devices through the detected carrier hotspot.

9 Claims, 6 Drawing Sheets

(51) Int. Cl.

| | | |
|---|---|---|
| *H04W 40/00* | (2009.01) | |
| *H04W 72/00* | (2009.01) | |
| *H04L 12/28* | (2006.01) | |
| *H04L 12/66* | (2006.01) | |
| *H04W 48/16* | (2009.01) | |
| *H04W 76/04* | (2009.01) | |
| *H04W 84/12* | (2009.01) | |
| *H04W 48/18* | (2009.01) | |
| *H04W 8/00* | (2009.01) | |
| *H04W 36/14* | (2009.01) | |
| *H04W 84/04* | (2009.01) | |
| *H04W 88/06* | (2009.01) | |

(52) U.S. Cl.
CPC .......... *H04W 84/12* (2013.01); *H04W 8/005* (2013.01); *H04W 36/14* (2013.01); *H04W 84/04* (2013.01); *H04W 88/06* (2013.01)

(58) Field of Classification Search
CPC ... H04L 47/14; H04L 65/1013; H04L 65/102; H04L 2012/2841; H04W 8/005; H04W 36/08; H04W 36/14; H04W 36/34; H04W 40/24; H04W 48/16; H04W 48/18; H04W 48/20; H04W 84/005; H04W 84/02; H04W 84/12; H04W 88/06; H04W 88/10; H04W 88/16; H04W 92/02; H04W 92/04; H04W 92/045
See application file for complete search history.

(56) References Cited

U.S. PATENT DOCUMENTS

| | | | |
|---|---|---|---|
| 7,254,119 B2 | 8/2007 | Jiang et al. | |
| 7,382,771 B2 | 6/2008 | Leblanc et al. | |
| 7,535,880 B1 | 5/2009 | Hinman et al. | |
| 7,551,577 B2 | 6/2009 | McRae | |
| 7,603,119 B1 | 10/2009 | Durig et al. | |
| 7,620,065 B2 * | 11/2009 | Falardeau | 370/465 |
| 7,672,695 B1 | 3/2010 | Rainnie et al. | |
| 7,720,098 B1 * | 5/2010 | Allen et al. | 370/468 |
| 7,761,087 B2 | 7/2010 | Kharia et al. | |
| 7,778,230 B2 | 8/2010 | Fulknier et al. | |
| 7,782,848 B2 | 8/2010 | Kalavade et al. | |
| 7,813,314 B2 | 10/2010 | Fulknier et al. | |
| 7,907,945 B2 | 3/2011 | Deprun | |
| 7,965,693 B2 | 6/2011 | Jiang et al. | |
| 7,995,516 B2 | 8/2011 | Zhou et al. | |
| 8,019,335 B2 | 9/2011 | Kallio | |
| 8,095,175 B2 | 1/2012 | Todd et al. | |
| 8,126,665 B1 * | 2/2012 | Whitson | H04M 11/002 340/870.03 |
| 8,750,265 B2 * | 6/2014 | Scherzer | H04W 48/14 370/338 |
| 2004/0260805 A1 * | 12/2004 | Aoyama et al. | 709/224 |
| 2005/0154933 A1 | 7/2005 | Hsu et al. | |
| 2006/0039332 A1 | 2/2006 | Kotzin | |
| 2008/0057956 A1 | 3/2008 | Black et al. | |
| 2008/0058031 A1 | 3/2008 | Deprun | |
| 2008/0117860 A1 | 5/2008 | Rodriguez et al. | |
| 2009/0046591 A1 | 2/2009 | Krishnaswamy et al. | |
| 2009/0046644 A1 | 2/2009 | Krishnaswamy et al. | |
| 2009/0219900 A1 | 9/2009 | Kokkinen et al. | |
| 2010/0029325 A1 | 2/2010 | Wang et al. | |
| 2011/0019651 A1 | 1/2011 | Fulknier et al. | |
| 2011/0051703 A1 | 3/2011 | Fulknier et al. | |
| 2011/0211548 A1 * | 9/2011 | Russel | H04L 29/12207 370/329 |

OTHER PUBLICATIONS

Sundaram, Niveditha, "Energy Efficient Communication in Multi-Radio PANs", Global Telecommunications Conference, Piscataway, NJ, pp. 1-6, Nov. 30, 2008.

Matoba, Akihisa, "Interconnecting Multi-Vendor Multi-Hop WLAN and Internet via Hotspot", Advanced Communication Technology, 11th International Conference, Piscataway, NJ, pp. 1403-1405, Feb. 15, 2009.

European Search Report for EP Application 10 162 986.3, Sep. 23, 2010.

* cited by examiner

SYSTEM, METHOD AND DEVICE FOR SWITCHING BETWEEN WWAN AND WLAN IN A MOBILE WIRELESS HOTSPOT

CROSS-REFERENCE TO RELATED APPLICATIONS

This application is a Continuation of U.S. patent application Ser. No. 12/645,398, entitled "SYSTEM, METHOD AND DEVICE FOR SWITCHING BETWEEN WWAN AND WLAN IN A MOBILE WIRELESS HOTSPOT DEVICE", filed Dec. 22, 2009, and is incorporated herein in its entirety as set forth in full and by reference.

BACKGROUND OF THE INVENTION

The present invention relates generally to the field of wireless communication and, more particularly, to mobile wireless hotspot devices.

SUMMARY OF THE INVENTION

One aspect of the present invention relates to an apparatus comprising a first interface module configured to interface with one or more user devices through a wireless local area network (WLAN) connection; a second interface module configured to interface with a wireless communication network through a wireless wide area network (WWAN) connection; and a controller. The controller is configured to detect availability of carrier hotspots; if no carrier hotspot is detected, route traffic to and from the one or more user devices through the WWAN connection; and if a carrier hotspot is detected, route traffic to and from the one or more user devices through the detected carrier hotspot.

In one embodiment, the first interface module is configured to function as a WLAN access point and a WLAN client.

In one embodiment, the first interface module includes a WiFi interface. In one embodiment, the second interface module includes a 3G or 4G network interface.

In one embodiment, the controller is configured to, upon detection of a carrier hotspot, establish connectivity with the carrier hotspot. In one embodiment, the controller is configured to establish connectivity with the carrier hotspot using a preconfigured profile for the detected carrier hotspot.

In another aspect of the invention, a method comprises detecting availability of carrier hotspots by a mobile router, the mobile router being connected to one or more user devices through a wireless local area network (WLAN) connection; if no carrier hotspot is detected, routing traffic to and from the one or more user devices through a WWAN connection; and if a carrier hotspot is detected, routing traffic to and from the one or more user devices through the detected carrier hotspot.

In another aspect, the invention relates to an apparatus comprising a processor and a memory unit coupled to the processor. The memory unit includes computer code for detecting availability of carrier hotspots by a mobile router, the mobile router being connected to one or more user devices through a wireless local area network (WLAN) connection; computer code for, if no carrier hotspot is detected, routing traffic to and from the one or more user devices through a WWAN connection; and computer code for, if a carrier hotspot is detected, routing traffic to and from the one or more user devices through the detected carrier hotspot.

DETAILED DESCRIPTION OF THE PREFERRED EMBODIMENTS

Figure 1:
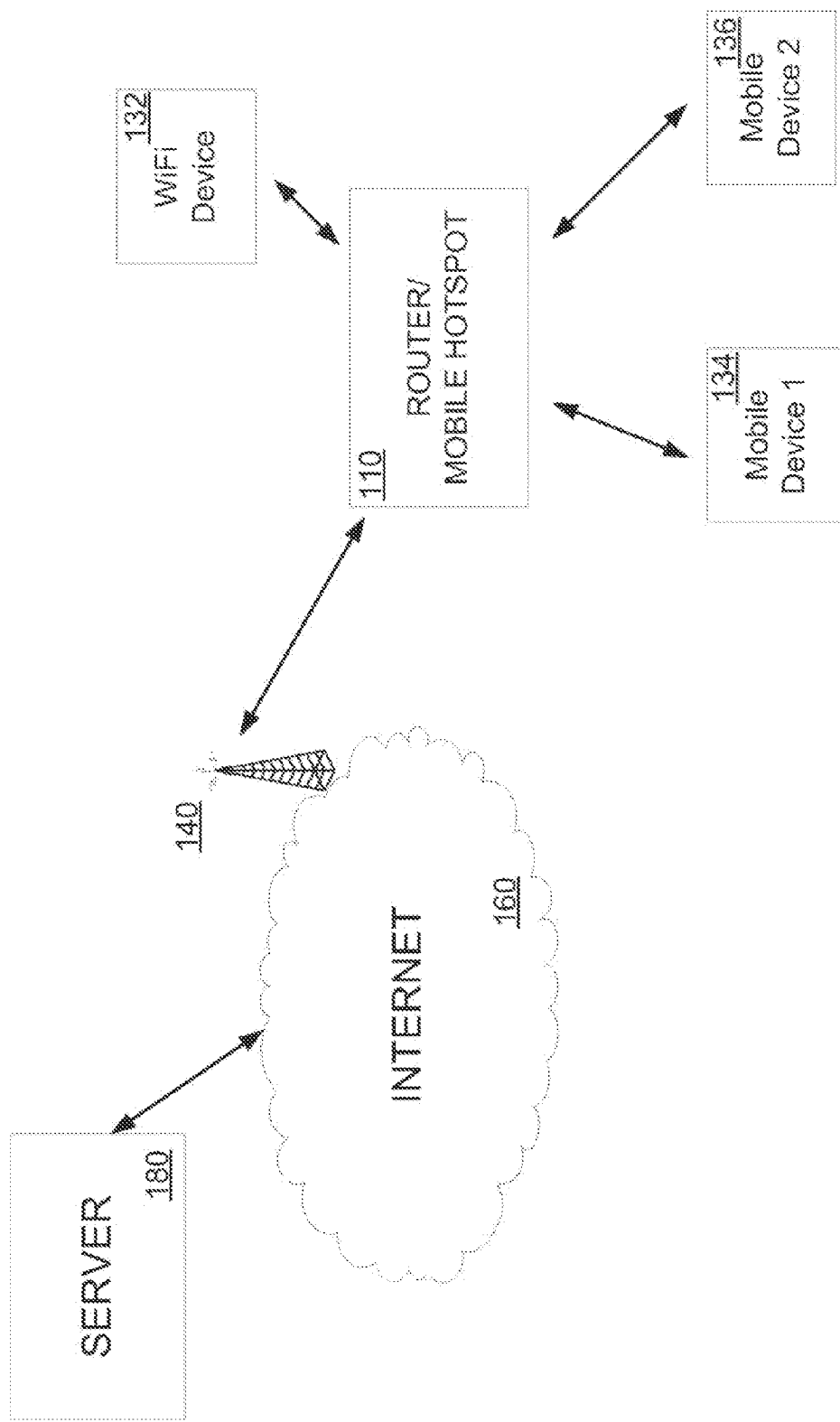
FIG. 1 is a schematic illustration of an arrangement according to an embodiment of the present invention.

Referring to FIG. 1, an arrangement in accordance with embodiments of the present invention is schematically illustrated. In the illustrated arrangement, a mobile router or hotspot device 110 is provided to allow network access to one or more user devices 132, 134, 136. In this regard, the mobile router 110 provides connectivity to the user devices 132, 134, 136 through a wireless local area network (WLAN) protocol, such as IEEE 802.11 or WiFi protocols. The user devices 132, 134, 136 may include, for example, a laptop, desktop, portable phone, personal digital assistant (PDA), smart phone or any other device capable of wireless communication. In accordance with embodiments of the present invention, the router 110 is a wireless, mobile, portable hotspot device. One embodiment of the mobile router 110 is described in further detail below with reference to FIG. 3.

The mobile router 110 may be configured to support a variety of user devices. For example, as illustrated in FIG. 1, the mobile router 110 may be accessed by multiple mobile user devices 134, 136, which may be laptops. In addition, WiFi devices, such as a webcam, may also access the mobile router 110. The number of devices which can be supported by the mobile router 110 may vary and may be determined by software, firmware or the like within the mobile router 110.

The mobile router 110 is configured to communicate with a service provider through, for example, a cellular base station 140 associated with a wireless communication network, such as a wireless wide area network (WWAN) (e.g., 3G or 4G network). Through the wireless communication network, access to a communication network such as the Internet 160 may be provided. Any of a number of servers (e.g., server 180) may be accessed by the user device through the mobile router 110 and the communication network 160.

In the arrangement of FIG. 1, the mobile router 110 is portable and may serve as a mobile hotspot for one or more communication devices. Thus, the mobile router 110 may allow WiFi communication with the user devices 132, 134, 136 and allow the user devices 132, 134, 136 to access a WWAN communication network, such as a 3G or 4G network, of one or more service providers.

While the mobile router 110 serves as a mobile hotspot, additional hotspots may be available in the vicinity of the mobile router 110. For example, fixed hotspots may be provided by the service providers and/or various establishments, such as coffee shops, shopping centers, hotels, etc. Such additional hotspots are referred to herein collectively as carrier hotspots. In this regard, in accordance with embodiments of the present invention, the mobile router 110 may be configured to detect the presence of such carrier hotspots and to offload certain traffic (e.g., data traffic) from the 3G/4G network and onto the carrier hotspots.

Figure 2:
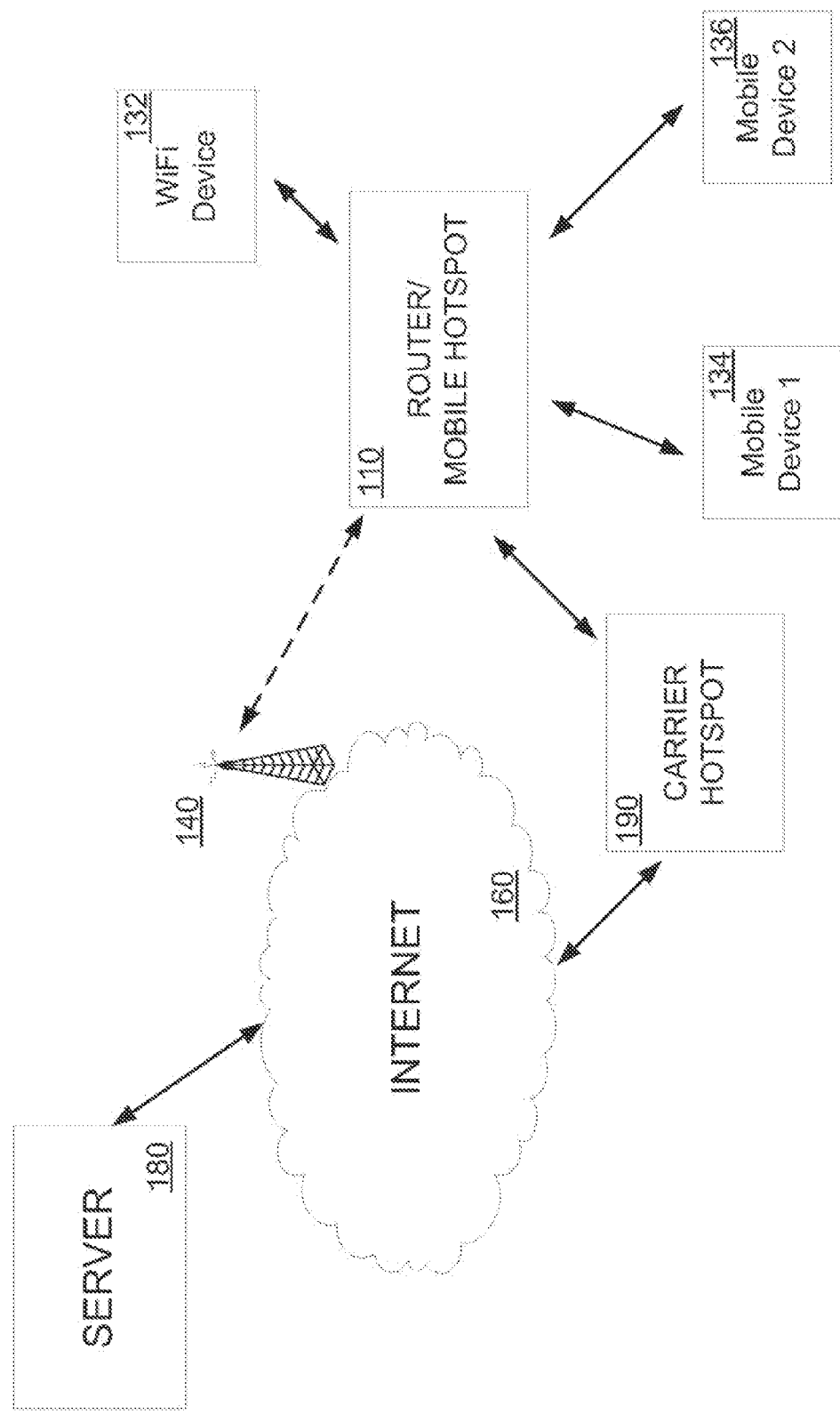
FIG. 2 is a schematic illustration of the arrangement of FIG. 1 with the mobile hotspot near a carrier hotspot.

For example, as illustrated in FIG. 2, the mobile router 110 may be providing 3G/4G connectivity to one or more user devices 132, 134, 136. When the mobile router 110 is in the vicinity of a carrier hotspot 190, data traffic for the user devices 132, 134, 136 may be switched from being provided through the 3G/4G network (shown by dotted line in FIG. 2) to being provided through the carrier hotspot 190 (shown by solid lines in FIG. 2). When the mobile hotspot 110 moves away from the vicinity of the carrier hotspot 190, data traffic may again be provided through the 3G/4G network.

Figure 3:
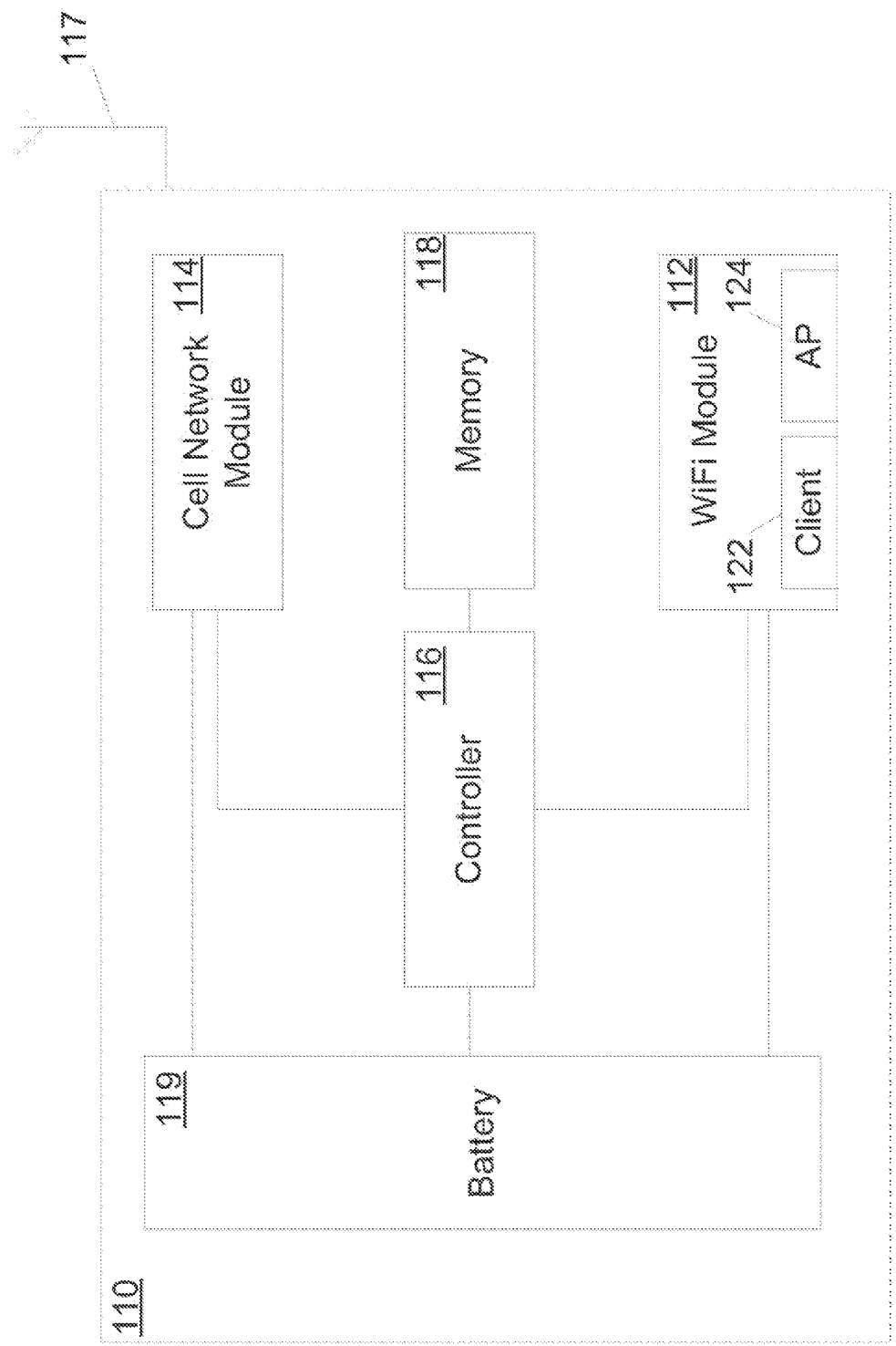
FIG. 3 is a schematic illustration of a mobile hotspot device in accordance with an embodiment of the present invention.

Referring now to FIG. 3, an embodiment of the mobile router 110 in accordance with embodiments of the present invention is schematically illustrated. In one embodiment, the mobile router 110 is a wireless wide area network WWAN/WiFi data modem personal router which allows multiple users to connect to a network (e.g., 3G or 4G network) through a WiFi connection. The mobile router 110 includes a first interface module and a second interface module. In one embodiment, the first interface module 112 is WLAN interface module, such as a WiFi interface module, configured to allow the mobile router 110 to wirelessly communicate with user devices using, for example, an IEEE 802.11 protocol. Of course, those skilled in the art will understand that other communication protocols may be used to interface with user devices.

The second interface module 114 allows the mobile router 110 to wirelessly interface with a network through, for example, a service provider, as illustrated by the base station 140 of FIGS. 1 and 2. As noted above, the network may be a 3G, 4G or other communication network. In accordance with an embodiment of the present invention, the second interface module 114 allows the mobile router 110 to communicate with a cellular network to obtain access to the Internet. Again, those skilled in the art will understand that any of a variety of communication protocols may be used for communication through the second interface module.

The mobile router 110 is also provided with a controller 116, or a processor, configured to control various operations of the mobile router 110. The controller 116 is coupled to the first and second interface modules 112, 114. Further, the controller 116 may be configured to process signals received through the interface modules 112, 114 and to transmit signals through the interface modules 112, 114. A memory unit 118 is provided to store, for example, data or computer code which may be accessed by the controller 116. The mobile router 110 may also include one or more antenna 117 to receive and transmit electronic signals, for example.

Further, the mobile router 110 includes a power source to supply power to the various components of the mobile router 110. Since the mobile router 110 is a portable electronic device, the power source may be a battery 119. In various embodiments, the battery 119 is a rechargeable battery such as a NiCd, Lithium-Ion or other type of rechargeable battery. Of course, the mobile router 110 may include various other components necessary for operation of the router.

In the embodiment of the mobile router 110 illustrated in FIG. 3, the first interface module 112 is a WiFi module configured to communicate with various devices using an IEEE 802.11 protocol. Thus, the first interface module 112 allows WiFi communication with various user devices. In this regard, the first interface module 112 includes an access point (AP) function 124. The AP function 124 may be implemented as software, hardware or firmware. The AP function 124 allows user devices to connect with the mobile router 110 in order to access other entities, such as a 3G/4G network.

In addition to the AP function 124, the first interface module 112 also includes a client function 122. The client function 122 allows the first interface module 112 and the mobile router 110 to function as a WiFi mobile device to communicate with another WiFi access point, for example. Thus, the mobile router 112 has the capability of functioning as both a WiFi access point and as a WiFi client.

Figure 4:
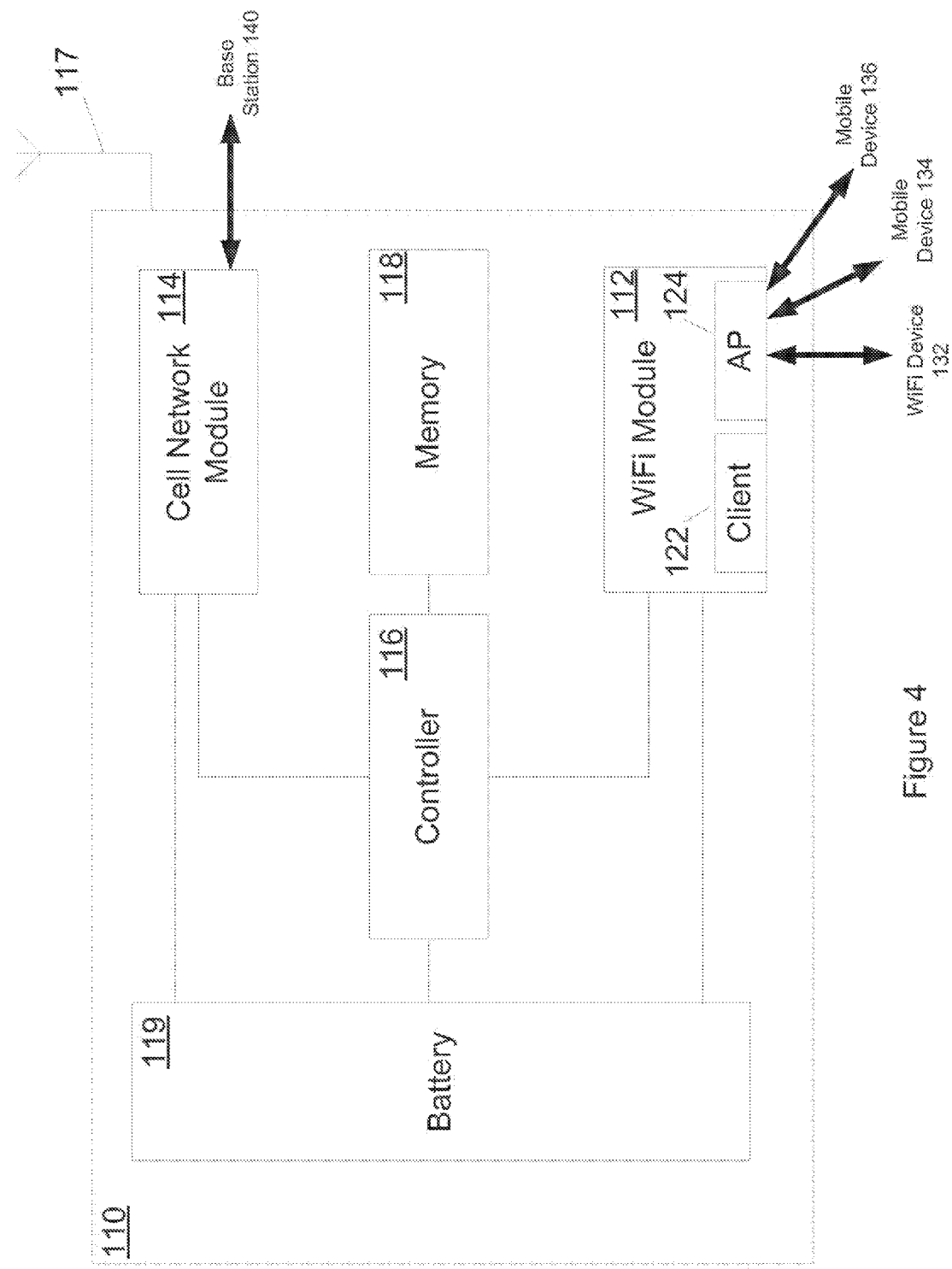
FIG. 4 is a schematic illustration of the mobile hotspot device of FIG. 3 with operation in the arrangement of FIG. 1.
Figure 5:
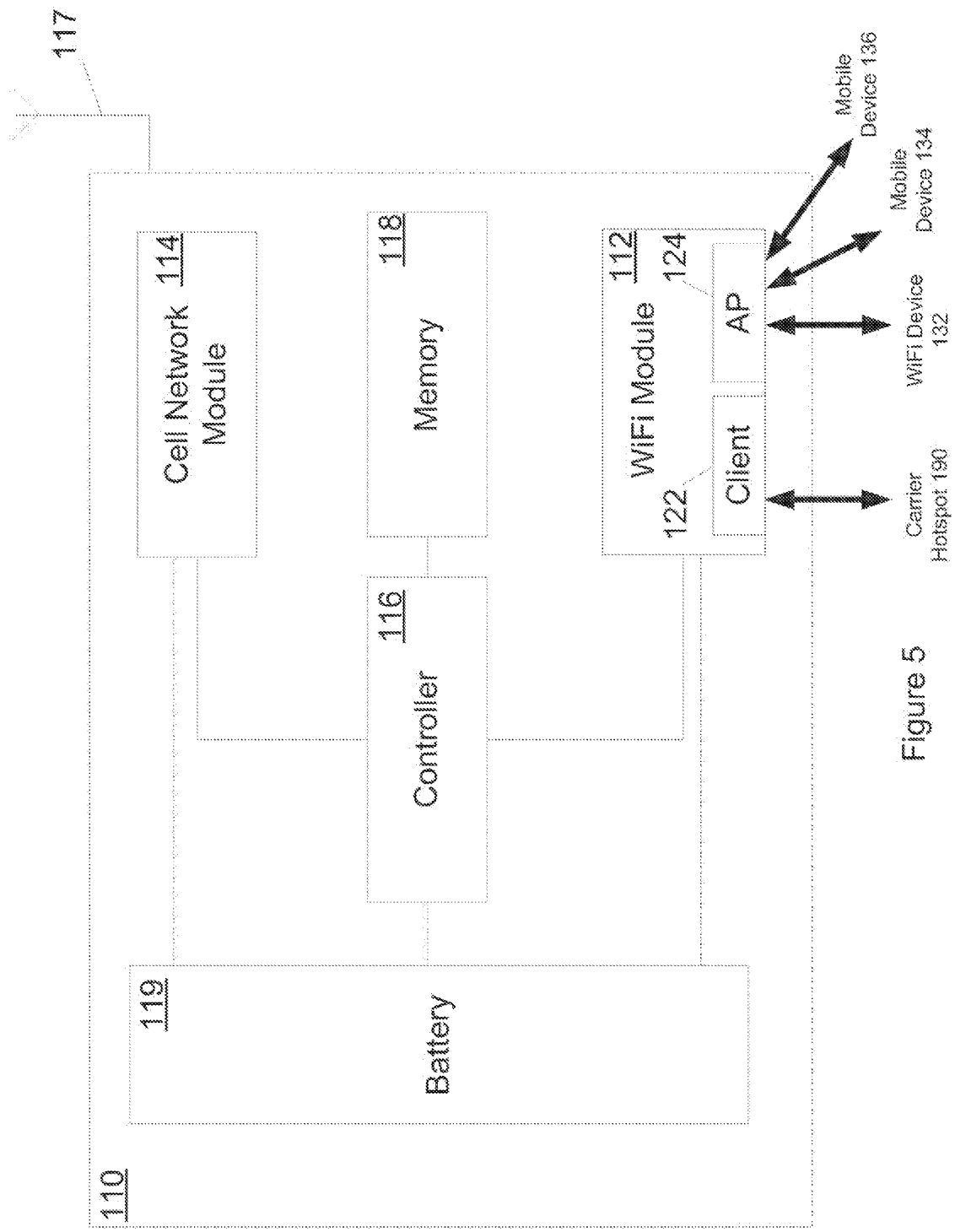
FIG. 5 is a schematic illustration of the mobile hotspot device of FIG. 3 with operation in the arrangement of FIG. 2.

Referring now to FIGS. 4 and 5, routing of communication in different situations is shown in the schematic illustration of the mobile router 110. Referring first to FIG. 4, when no carrier hotspot is available, as illustrated in the arrangement of FIG. 1, data services may be provided to various user devices through a 3G/4G network. In this regard, as illustrated in FIG. 4, user devices 132, 134, 136 may establish communication with the mobile router 110 through WiFi connections with the first interface module 112. Thus, the AP function 124 of the first interface module 112 allows the user devices 132, 134, 136 to be WiFi client devices, while the mobile router 110 serves as the WiFi access point. The controller 116 can then facilitate traffic to and from the user devices 132, 134, 136 through the second interface module 114, which establishes a connection with a 3G/4G network. Thus, data services may be provided to the user devices 132, 134, 136 through the mobile router 110 and a 3G/4G network.

Referring now to FIG. 5, when a carrier hotspot 190 is available, as illustrated in the arrangement of FIG. 2, data services may be provided to various user devices through the carrier hotspot 190, thereby offloading traffic from the 3G/4G network. In this regard, as illustrated in FIG. 5, user devices 132, 134, 136 may still establish communication with the mobile router 110 through WiFi connections with the first interface module 112. Thus, the AP function 124 of the first interface module 112 allows the user devices 132, 134, 136 to be WiFi client devices, while the mobile router 110 serves as the WiFi access point.

With the availability of the carrier hotspot 190, the mobile router 110 establishes a connection with the carrier hotspot 190. In this regard, the client function 122 of the first interface module 112 allows the mobile router 110 to act as a WiFi client relative to the carrier hotspot 190. The controller 116 can then facilitate traffic to and from the user devices 132, 134, 136 through the carrier hotspot 190. Thus, data services may be provided to the user devices 132, 134, 136 through the mobile router 110 and the carrier hotspot 190.

Thus, the mobile router 110 may function as a WiFi access point for the user devices 132, 134, 136 and, simultaneously, as a WiFi client for the carrier hotspot 190.

Figure 6:
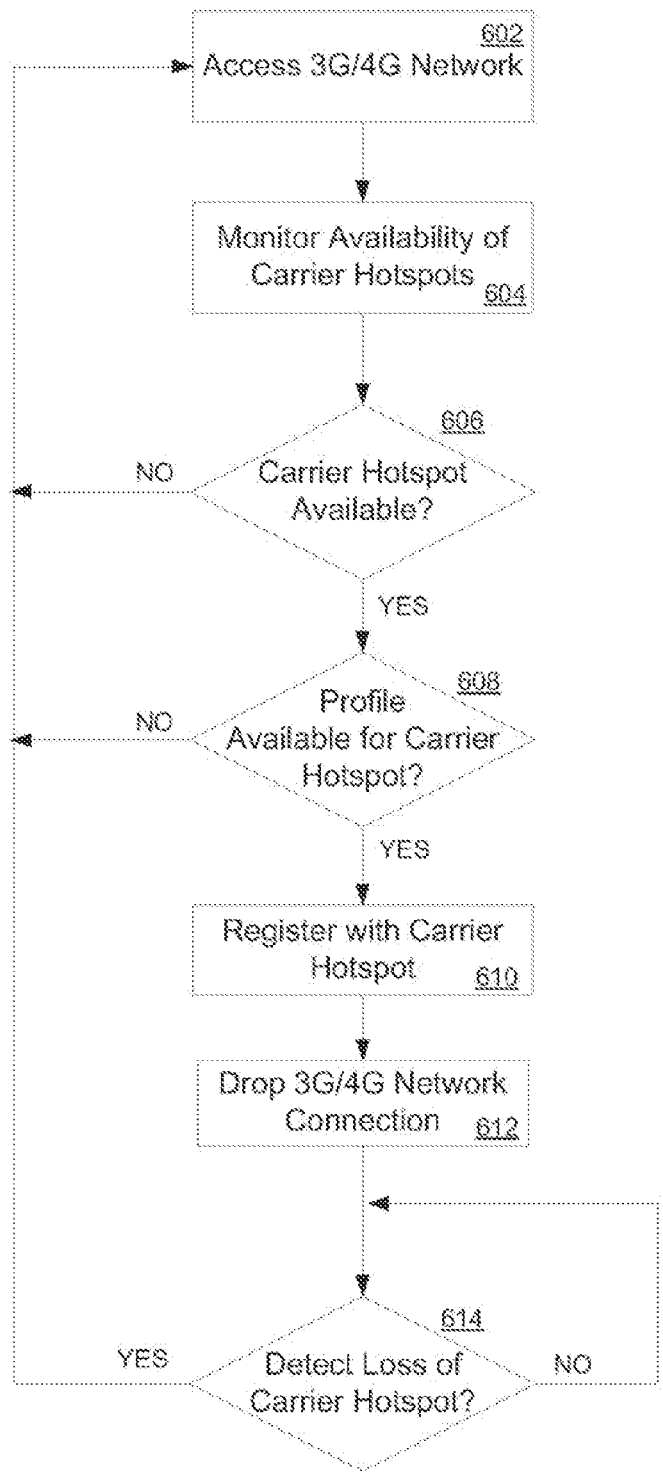
FIG. 6 is a flow chart illustrating a method for switching between modes of operation in accordance with an embodiment of the present invention.

Referring now to FIG. 6, a flow chart illustrates a method for switching between modes of operation in accordance with an embodiment of the present invention. In this regard, the mobile router 110 may switch between one mode of operation when no carrier hotspot is available and another mode of operation when a carrier hotspot is available. In accordance with the embodiment illustrated in FIG. 6, the mobile router may be operating with no carrier hotspots available and, therefore, accessing a WWAN, such as a 3G or 4G network (block 602). In this regard, the mobile router may be providing data services through a WWAN to one or more user devices accessing the mobile router through a WiFi connection.

The mobile router 110 may include a process running in the background which monitors availability of other networks, such as other WiFi networks, and various hotspots, such as carrier hotspots (block 604). This monitoring process may run in the controller 116 and may utilize other components of the mobile router 110, such as the antenna 117 and the client function 122 of the first interface module 112.

At block 606, it is determined whether a carrier hotspot has been detected and is available. If the determination is made that no carrier hotspot is available, the process returns to block 602 and continues to access the WWAN through the second interface module 114 to provide data services to connected user devices. On the other hand, if the determination is made at block 606 that a carrier hotspot has been detected, the process proceeds to block 608.

At block 608, a further determination is made as to whether the detected carrier hotspot is accessible by the mobile router 110. In this regard, one or more preconfigured profiles may be stored for carrier hotspots associated with, for example, a particular carrier or service provider. The preconfigured profiles may be stored in the memory 118 of the mobile router 110 and may include service set identifiers (SSIDs), authentication types, actual authentication data and any other parameters required for automatic access of the carrier hotspot.

Thus, at block 608, in order to determine accessibility, the determination may be made as to whether an appropriate profile is available for the detected carrier hotspot. If no appropriate profile is available, the process returns to block 602 and continues to access the WWAN through the second interface module 114. On the other hand, if an appropriate profile is available, the process proceeds to block 610 in order to begin switching modes of operation.

At block 610, the mobile router 110 registers with the carrier hotspot 190. Once registration is confirmed and a WiFi connection is established between the mobile router 110 and the carrier hotspot 190, the connection to the WWAN may be dropped. Thus, traffic may be offloaded from the WWAN (e.g., 3G/4G network) to the carrier hotspot 190.

In certain embodiments, with connectivity to the carrier hotspot 190 established, the mobile router 110 may continuously or regularly monitor the connection to the carrier hotspot 190. For example, at block 614, the mobile router 110 may determine whether loss of the carrier hotspot 190 has been detected. In this regard, a loss may be detected when the strength of the signal from the carrier hotspot drops below a certain predetermined threshold.

If the determination is made at block 614 that no loss of the carrier hotspot 190 has been detected, the process continues to monitor the connectivity while continuing to direct traffic through the carrier hotspot 190. On the other hand, if the determination is made that the connection to the carrier hotspot 190 has been lost (e.g., signal strength has dropped below a predetermined threshold), the mobile router may access the WWAN to provide data services to the user devices (block 602) and may resume monitoring for other carrier hotspots (block 604).

In various embodiments, the transition between the two modes is seamless to the user devices. The transition is performed automatically by the mobile router 110 based on detection of or loss of carrier hotspots. In other embodiments, the user devices may be signaled upon the transition solely for notification purposes.

Various embodiments of the present invention may be implemented in a system having multiple communication devices that can communicate through one or more networks. The system may comprise any combination of wired or wireless networks such as a mobile telephone network, a wireless Local Area Network (LAN), a Bluetooth personal area network, an Ethernet LAN, a wide area network, the Internet, etc.

Communication devices may include a mobile telephone, a personal digital assistant (PDA), a notebook computer, etc. The communication devices may be located in a mode of transportation such as an automobile.

The communication devices may communicate using various transmission technologies such as Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc.

An electronic device in accordance with embodiments of the present invention may include a display, a keypad for input, a microphone, an ear-piece, a battery, and an antenna. The device may further include radio interface circuitry, codec circuitry, a controller and a memory.

Various embodiments described herein are described in the general context of method steps or processes, which may be implemented in one embodiment by a software program product or component, embodied in a machine-readable medium, including executable instructions, such as program code, executed by entities in networked environments. Generally, program modules may include routines, programs, objects, components, data structures, etc. that perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

Software implementations of various embodiments of the present invention can be accomplished with standard programming techniques with rule-based logic and other logic to accomplish various database searching steps or processes, correlation steps or processes, comparison steps or processes and decision steps or processes.

The foregoing description of various embodiments have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
   detecting availability of hotspots by a mobile router, the mobile router being connected to one or more user devices through a wireless local area network (WLAN) connection;
   if no hotspot is detected, routing traffic to and from the one or more user devices through a WWAN connection; and
   if a hotspot is detected, connecting the mobile router to the detected hotspot through the WLAN connection and routing traffic to and from the one or more user devices through the detected hotspot; wherein if a carrier hotspot is detected, the mobile router functions as a dynamic WLAN access point for the user devices and a dynamic WLAN client for the detected carrier hotspot.

2. The method of claim 1, wherein the WLAN connection is a WiFi connection.

3. The method of claim 1, wherein the WWAN connection provides connectivity to a 3G or 4G network.

4. The method of claim 1, wherein connectivity is established between the mobile router and the detected hotspot using a preconfigured profile for the detected hotspot.

5. A mobile router, comprising:
   a wireless local area network (WLAN) interface configured to allow the mobile router to function as a dynamic access point (AP) to allow one or more user devices to connect to the mobile router and function as a dynamic client to allow the mobile router to communicate with a hotspot; and
   a wireless wide area network (WWAN) interface configured to allow the mobile router to communicate with a wireless communication network;
   wherein, when a hotspot is available for connection to the mobile router, the mobile router routes communications from the one or more user devices through the WLAN interface to the available hotspot and, when a hotspot is not available for connection to the mobile router, the mobile router routs communications from the one or more user devices through the WWAN interface to the wireless communication network.

6. The mobile router of claim 5, wherein the WLAN interface includes a WiFi interface.

7. The mobile router of claim 5, wherein the WWAN interface includes a 3G or 4G network interface.

8. The mobile router of claim 5, wherein when a hotspot is available for connection to the mobile router, the mobile router establishes connectivity with the hotspot.

9. The mobile router of claim 8, wherein the mobile router is configured to establish connectivity with the hotspot using a preconfigured profile for the hotspot.

* * * * *